US012049357B2

(12) United States Patent
Foster et al.

(10) Patent No.: US 12,049,357 B2
(45) Date of Patent: Jul. 30, 2024

(54) LOCKING MECHANISM FOR CONTAINER

(71) Applicant: Rehrig Pacific Company, Los Angeles, CA (US)

(72) Inventors: Derick Foster, Cumming, GA (US); John Matthew Thomson, Dahlonega, GA (US)

(73) Assignee: REHRIG PACIFIC COMPANY, Los Angeles, CA (US)

( * ) Notice: Subject to any disclaimer, the term of this patent is extended or adjusted under 35 U.S.C. 154(b) by 0 days.

(21) Appl. No.: 17/857,460

(22) Filed: Jul. 5, 2022

(65) Prior Publication Data

US 2023/0010597 A1 Jan. 12, 2023

Related U.S. Application Data

(60) Provisional application No. 63/219,126, filed on Jul. 7, 2021.

(51) Int. Cl.

*B65F 1/16* (2006.01)
*B65F 1/02* (2006.01)
*B65F 1/14* (2006.01)

(52) U.S. Cl.

CPC .............. *B65F 1/1615* (2013.01); *B65F 1/02* (2013.01); *B65F 1/1473* (2013.01); *B65F 1/1646* (2013.01); *B65F 2210/128* (2013.01)

(58) Field of Classification Search

CPC ........ B65F 1/1615; B65F 1/02; B65F 1/1473; B65F 1/1646; B65F 2210/128
USPC .......................................................... 220/263
See application file for complete search history.

(56) References Cited

U.S. PATENT DOCUMENTS

| | | | | |
|---|---|---|---|---|
| 4,182,530 | A | 1/1980 | Hodge | |
| 5,042,856 | A | 8/1991 | Goodman | |
| 5,213,382 | A | 5/1993 | Dawdy | |
| 6,902,080 | B2 | 6/2005 | Busch | |
| 6,997,487 | B2 | 2/2006 | Kitis | |
| 8,313,126 | B2 | 11/2012 | Fekovich | |
| 9,248,964 | B2 | 2/2016 | Banik | |
| 9,260,891 | B2 | 2/2016 | Tredwell | |
| 9,821,957 | B1 | 11/2017 | Hurst | |
| 9,963,276 | B1 | 5/2018 | Arthurs | |
| 10,046,911 | B2 | 8/2018 | Reeb | |
| 10,377,567 | B1 * | 8/2019 | Jones | B65F 1/1615 |
| 10,414,584 | B2 | 9/2019 | Reeb | |
| 10,526,137 | B2 | 1/2020 | Dworkin | |
| 11,292,665 | B2 | 4/2022 | Hodge | |

(Continued)

FOREIGN PATENT DOCUMENTS

| | | |
|---|---|---|
| DE | 102020130943 | 5/2022 |
| GB | 2533716 | 6/2016 |

(Continued)

*Primary Examiner* — J. Gregory Pickett
*Assistant Examiner* — Niki M Eloshway
(74) *Attorney, Agent, or Firm* — Carlson, Gaskey & Olds, P.C.

(57) ABSTRACT

A cart includes a body portion forming a receptacle. A lid is pivotable relative to the body portion. A lock assembly includes a hasp fixed relative to one of the lid or the body portion. A lock is fixed relative to the other of the lid or the body portion and includes a catch for engaging the hasp and an actuator in electrical communication with a controller. The actuator is configured to actuate the catch to selectively secure the hasp relative to the lock.

25 Claims, 13 Drawing Sheets

(56) References Cited

U.S. PATENT DOCUMENTS

| | | | | |
|---|---|---|---|---|
| 11,345,540 | B1 | 5/2022 | DiBartolo | |
| 2007/0126561 | A1 | 6/2007 | Breed | |
| 2007/0139216 | A1 | 6/2007 | Breed | |
| 2013/0087562 | A1* | 4/2013 | Thukral | B65F 1/1615 220/210 |
| 2014/0020436 | A1 | 1/2014 | Matuschek | |
| 2014/0208813 | A1* | 7/2014 | Reeb | B65F 1/1646 70/277 |
| 2018/0044941 | A1* | 2/2018 | Fink | B65F 1/1615 |
| 2018/0058103 | A1 | 3/2018 | Heisler | |
| 2020/0115156 | A1* | 4/2020 | Hodge | B65F 1/1615 |
| 2020/0115157 | A1* | 4/2020 | Dworkin | E05C 1/004 |
| 2022/0106112 | A1 | 4/2022 | Martin, II | |
| 2022/0267088 | A1 | 8/2022 | Patel | |
| 2022/0319263 | A1* | 10/2022 | Scott | G07C 9/00944 |
| 2022/0327874 | A1* | 10/2022 | Davidson | G07C 9/00896 |

FOREIGN PATENT DOCUMENTS

| | | |
|---|---|---|
| WO | 220287 | 3/2002 |
| WO | 2012149033 | 11/2012 |

* cited by examiner

LOCKING MECHANISM FOR CONTAINER

CROSS-REFERENCE TO RELATED APPLICATIONS

This application claims priority to U.S. Provisional Application No. 63/219,126 which was filed on Jul. 7, 2021 and is incorporated herein by reference.

BACKGROUND

The present disclosure relates to a container and, more particularly, to a lock assembly for a lid on the container.

Containers, such as roll-out carts, are commonly used by municipalities for collecting debris from households or businesses. The containers are movable by tipping and balancing the container on a pair of wheels adjacent a rear side of the base of the container. It is common for these containers to contain food waste that may attract animals in the area that would open the container and spread the waste. The lid on the container can prevent many animals from accessing the food waste. However, in the case of larger animals, such as with bears, additional steps, such as the use of a lock, may need to be taken to prevent the bear from accessing the contents in the container.

SUMMARY

In one exemplary embodiment, a cart includes a body portion forming a receptacle. A lid is pivotable relative to the body portion. A lock assembly includes a hasp fixed relative to one of the lid or the body portion. A lock is fixed relative to the other of the lid or the body portion and includes a catch for engaging the hasp and an actuator in electrical communication with a controller. The actuator is configured to actuate the catch to selectively secure the hasp relative to the lock.

In another embodiment according to any of the previous embodiments, the lock includes an exterior portion located on an outer side of the body portion. An interior portion is located on an inner side of the body portion.

In another embodiment according to any of the previous embodiments, the exterior portion includes at least one release button configured to selectively secure the hasp relative to the lock.

In another embodiment according to any of the previous embodiments, the at least one release button includes a first release button located in a first recess and a second release button located in a second recess.

In another embodiment according to any of the previous embodiments, the first and second release buttons are movable between a first position located in a respective one of the first and second recesses and a second position at least partially recessed into a central wall dividing the first recess from the second recess.

In another embodiment according to any of the previous embodiments, the catch is attached to the interior portion.

In another embodiment according to any of the previous embodiments, the catch is pivotably about a pivot axis.

In another embodiment according to any of the previous embodiments, a radio frequency receiver is in electrical communication with the controller.

In another exemplary embodiment, a cart includes a body portion forming a receptacle. A lid is pivotable relative to the body portion. A lock assembly is attached to the cart and includes a hasp attached to the lid. A lock is fixed relative to the body portion and includes a catch for engaging the hasp with a first release button located in a first recess and a second release button located in a second recess.

In another embodiment according to any of the previous embodiments, the first release button and the second release button are separated by a central wall and are depressible in a direction of the central wall.

In another embodiment according to any of the previous embodiments, the lock includes an exterior portion located on an outer side of the body portion. An interior portion is located on an inner side of the body portion.

In another embodiment according to any of the previous embodiments, the first release button and the second release button are located on the exterior portion.

In another embodiment according to any of the previous embodiments, the catch is attached to the interior portion.

In another embodiment according to any of the previous embodiments, the first and second release buttons are movable between a first position located in a respective one of a first and second recesses and a second position at least partially recessed into a central wall dividing the first recess from the second recess.

In another embodiment according to any of the previous embodiments, the lock includes an actuator configured to selectively actuate a catch to secure the hasp relative to the lock.

In another embodiment according to any of the previous embodiments, an RF transmitter in electrical communication with a controller configured to actuate the catch.

In another exemplary embodiment, a method of operating a lock assembly includes engaging one of a hasp or a catch attached to a lid of a cart with the other of the hasp or the catch attached to a body portion of the cart to fix the lid relative to the body portion. The catch is released relative to the hasp in response to at least one of a mechanical input to the lock assembly or the lock assembly receiving a signal from a remote location.

In another embodiment according to any of the previous embodiments, the signal is a radio frequency signal. The remote location includes a trash collecting vehicle. The lock assembly includes a radio frequency receiver in communication with a controller for directing an actuator to release the catch relative to the hasp.

In another embodiment according to any of the previous embodiments, the lock assembly includes an exterior portion located on an outer side of the body portion and an interior portion located on an inner side of the body portion. A first release button is located in a first recess in the exterior portion and a second release button located in a second recess in the exterior portion. Depressing at least one of the first or second release buttons releases the catch relative to the hasp.

In another embodiment according to any of the previous embodiments, the lock assembly includes an exterior portion located on an outer side of the body portion. An inner portion is located on an interior of the body portion. The catch is located on the interior portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
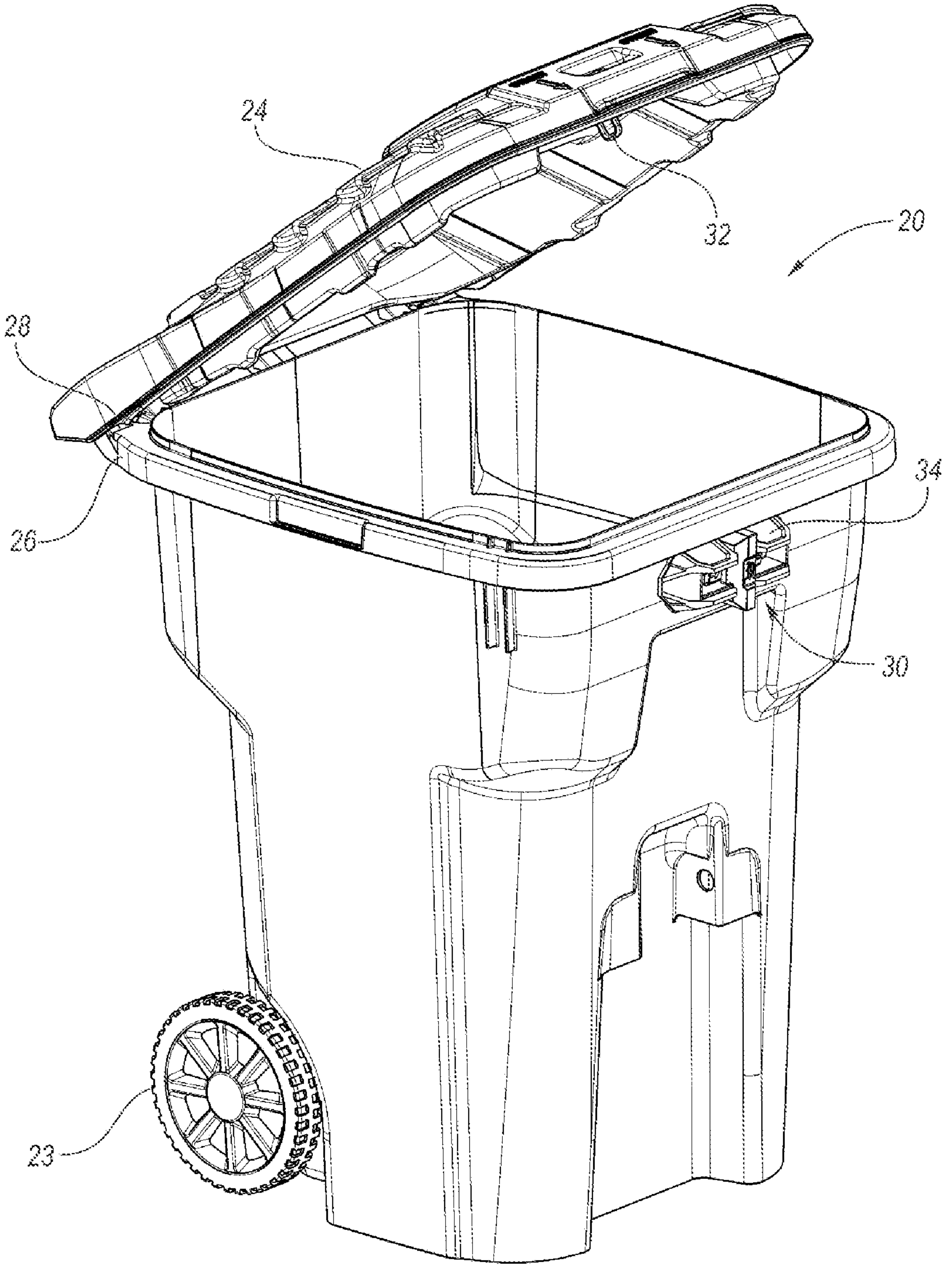
FIG. 1 illustrates an example roll-out cart.
Figure 2:
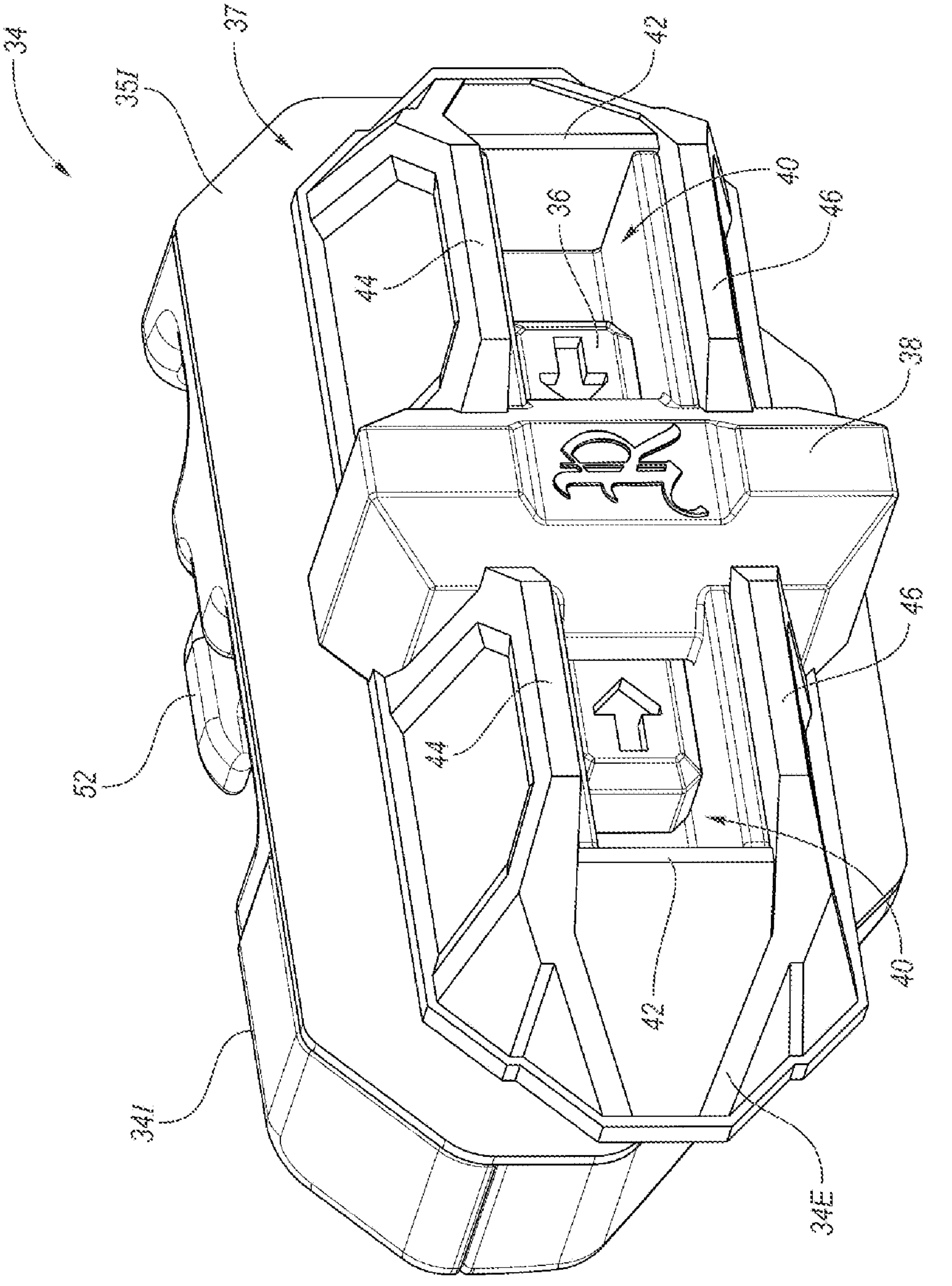
FIG. 2 is a front perspective view of a lock portion on the roll-out cart of FIG. 1.
Figure 3:
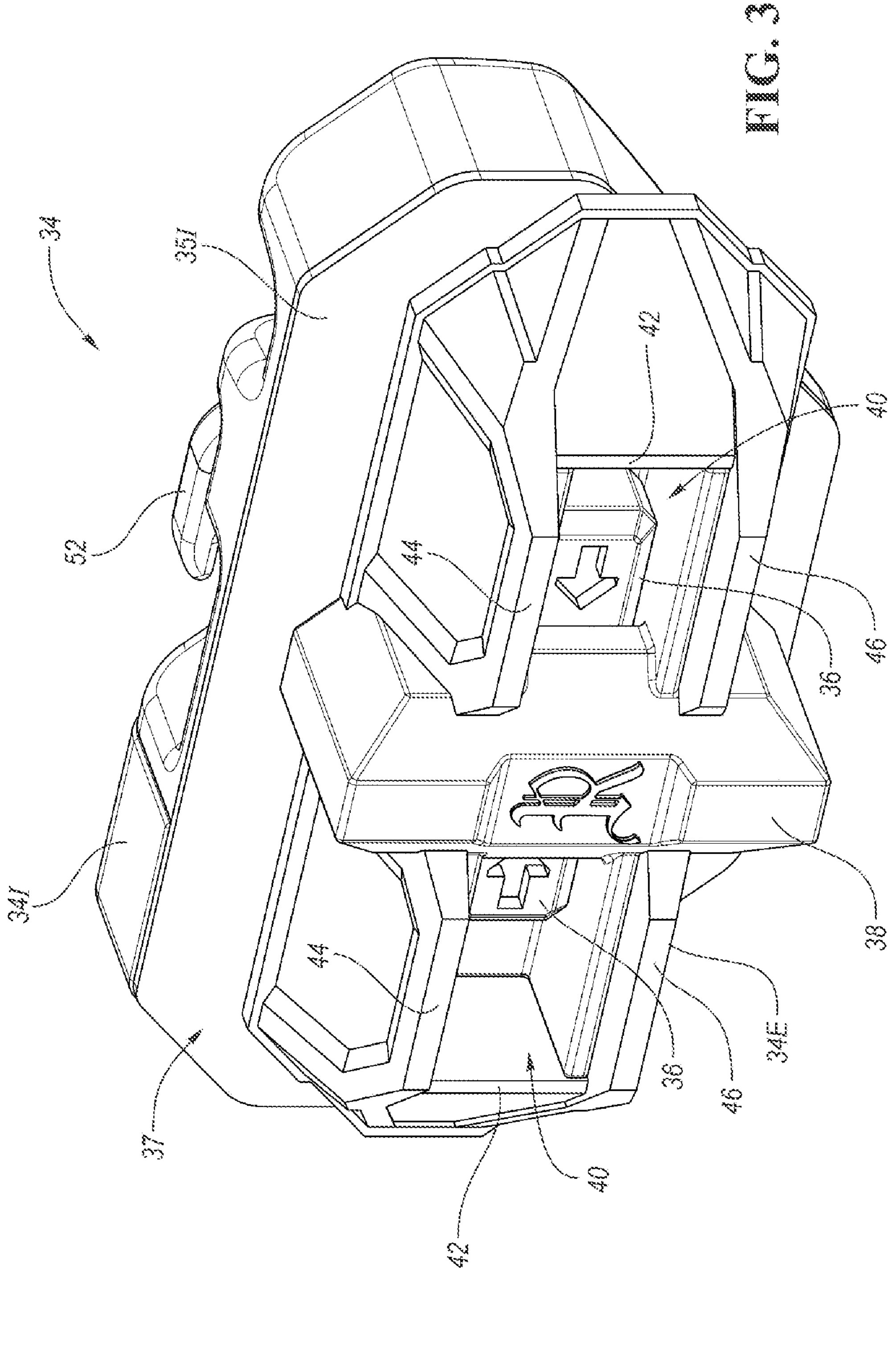
FIG. 3 is another front perspective view the lock portion of FIG. 2.

FIG. 1 illustrates an example roll-out cart 20. The cart 20 includes a body portion 22 forming a receptacle for receiving materials, such as debris or household waste. Because the cart 20 can store household waste, which can include food scraps, the cart 20 can attract animals when stored outside or left by the roadside for pick up. To prevent access into the cart 20, the cart 20 includes a lid 24 that pivots about a hinge 26. The cart 20 also includes a handle 28 fixed to the body portion 22 that incorporates the hinge 26 and allows a user to maneuver the cart 20 on wheels 23. A locking assembly 30 allows selective access into the cart 20. The locking assembly 30 includes a hasp 32 fixed relative to the lid 24 and a lock 34 fixed relative to the body portion 22 for receiving the hasp 32 to prevent the lid 24 from pivoting about the hinge 26.

Figure 7:
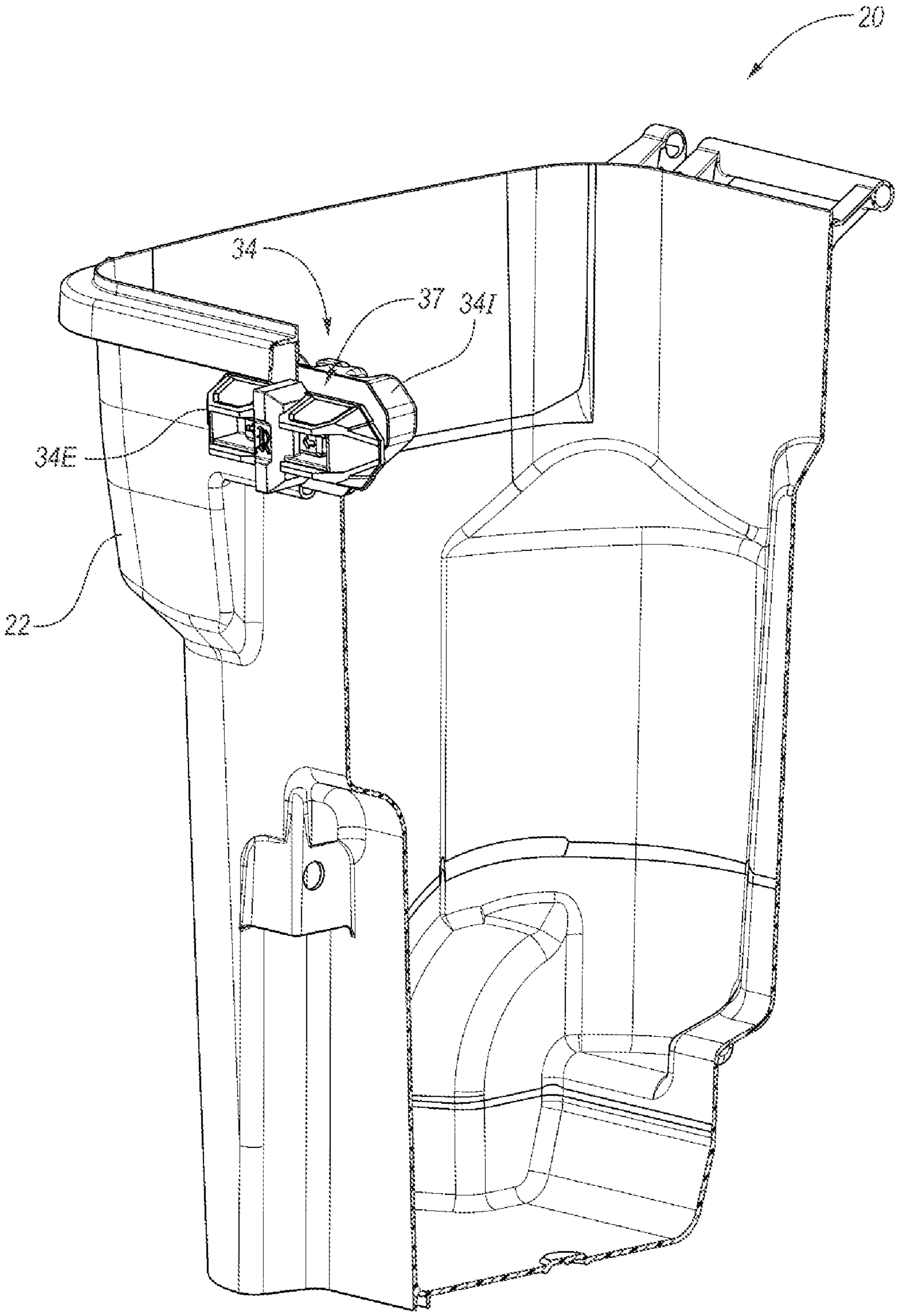
FIG. 7 is a front perspective view of the roll-out cart of FIG. 1 in cross section with the lock portion of FIG. 2.
Figure 8:
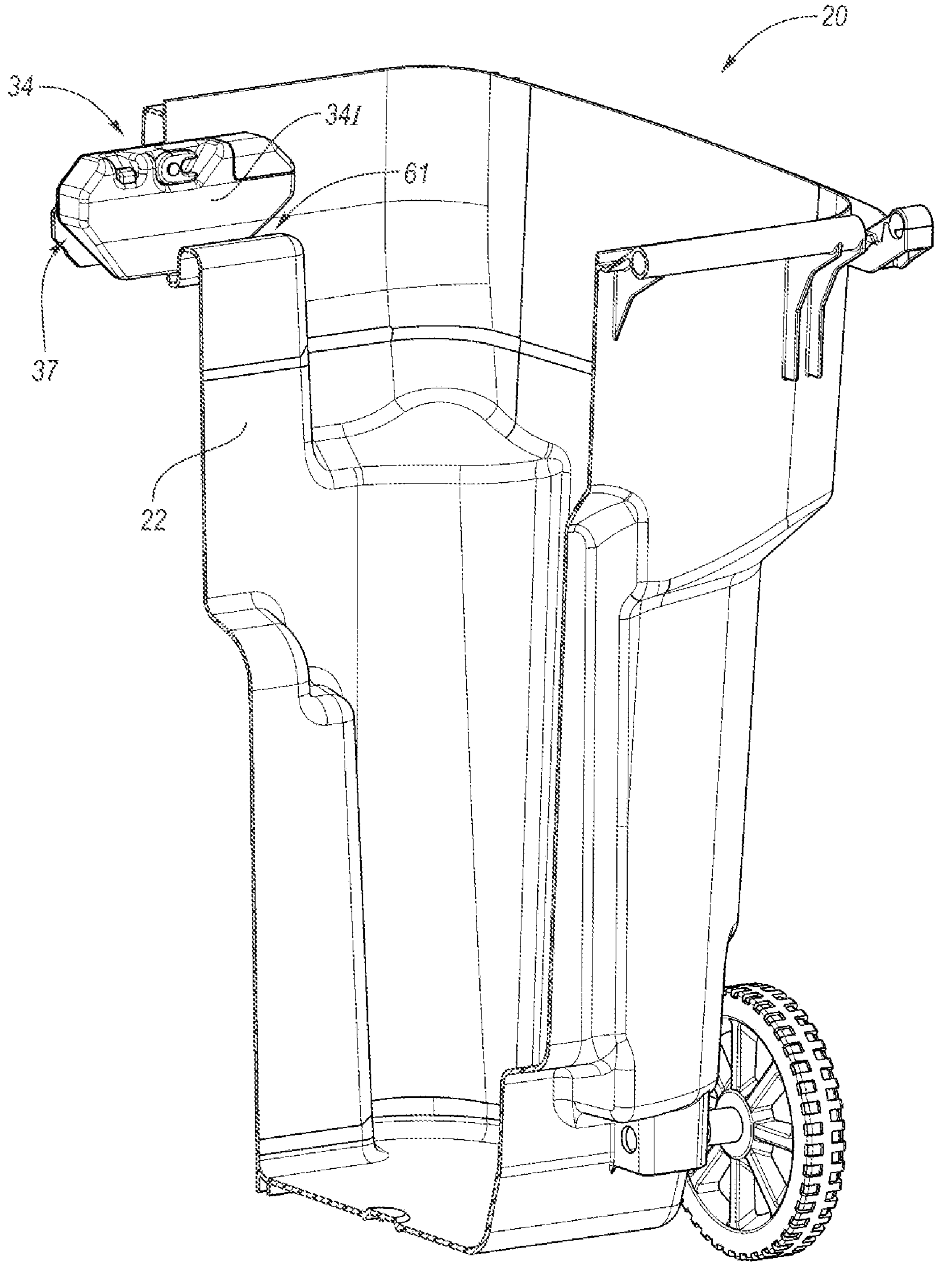
FIG. 8 is a rear perspective view of the roll-out cart of FIG. 1 in cross section with the lock portion of FIG. 2.

As shown in FIGS. 2-6, the lock 34 includes an exterior lock portion 34E located on an exterior side of the body portion 22 and an interior lock portion 341 located on an interior side of the body portion 22. The interior side of the body portion 22 defines the receptacle for receiving materials therein. The interior and exterior lock portions 341, 34E include opposing interior faces 351, 35E, respectively, that define a passageway 37 that accepts a wall segment of the body portion 22 of the cart 20 (FIGS. 7 and 8). The passageway 37 (FIGS. 5-6) is generally equal to a thickness of the body portion 22 of the cart 20 in the area of the lock 34 and sandwiches the wall segment. The wall segment includes an opening (not shown) for accepting mechanical and/or electrical components 41 (FIG. 5) extending from the exterior lock portion 34E to the interior lock portion 341. Also, as shown in FIG. 8, the wall segment adjacent the lock 34 includes a trough 61 that accepts a lower portion of the interior lock portion 341 to direct debris away from the interior lock portion 341 when being poured out of the cart 20.

The exterior lock portion 34E includes a pair of latch release buttons 36 that are depressible inward toward a central divider 38 that extends vertically and generally perpendicular to a direction of motion of the buttons 36. The buttons 36 are also located in troughs 40 that are recessed into the exterior lock portion 34E and at least partially defined by the central divider 38 on an inner lateral side and outer walls 42 on outer lateral sides. A pair of upper walls 44 and lower walls 46 define the upper and lower sides of the troughs 40, respectively'. Alternatively, the central divider 38 would not separate the upper walls 44 and lower walls 46 into separate walls such that each of the upper and lower sides of the troughs 40 would be defined by a single upper or lower wall. The directional references in this disclosure are in relation to the placement of the lock 34 on the cart 20 with the cart 20 in an upright standing position unless stated otherwise.

The buttons 36 can release the hasp 32 from the lock 34 in multiple configurations of engagement. In one example, both of the buttons 36 are required to be depressed simultaneously to release the hasp 32. In another example, both of the buttons 36 are required to be depressed but not simultaneously. In yet another example, only a single button 36 is required to be depressed to release the hasp 32. Additionally, the lock 34 includes a release button 50 (FIG. 4) on the interior lock portion 341 to allow the hasp 32 to be released from the lock 34 from the interior of the cart 20. In the illustrated example, the hasp 32 includes a base plate for attaching to the lid 24 and a hook or loop extending from the base plate.

One feature of locating the buttons 36 in the troughs 40 is protection of the buttons 36 from animal tampering, such as from bears or raccoons, while allowing easy access of operation by human users. The placement of the buttons 36 is also sufficiently wide enough to prevent most animals from being able to span the distance between outer edges of the buttons 36. Additionally, the recessed position of the buttons 36 in the troughs 40 protects the buttons 36 from being engaged by a biting force from a bear or other large animal as the mouth is unable to enter the troughs 40.

Figure 4:
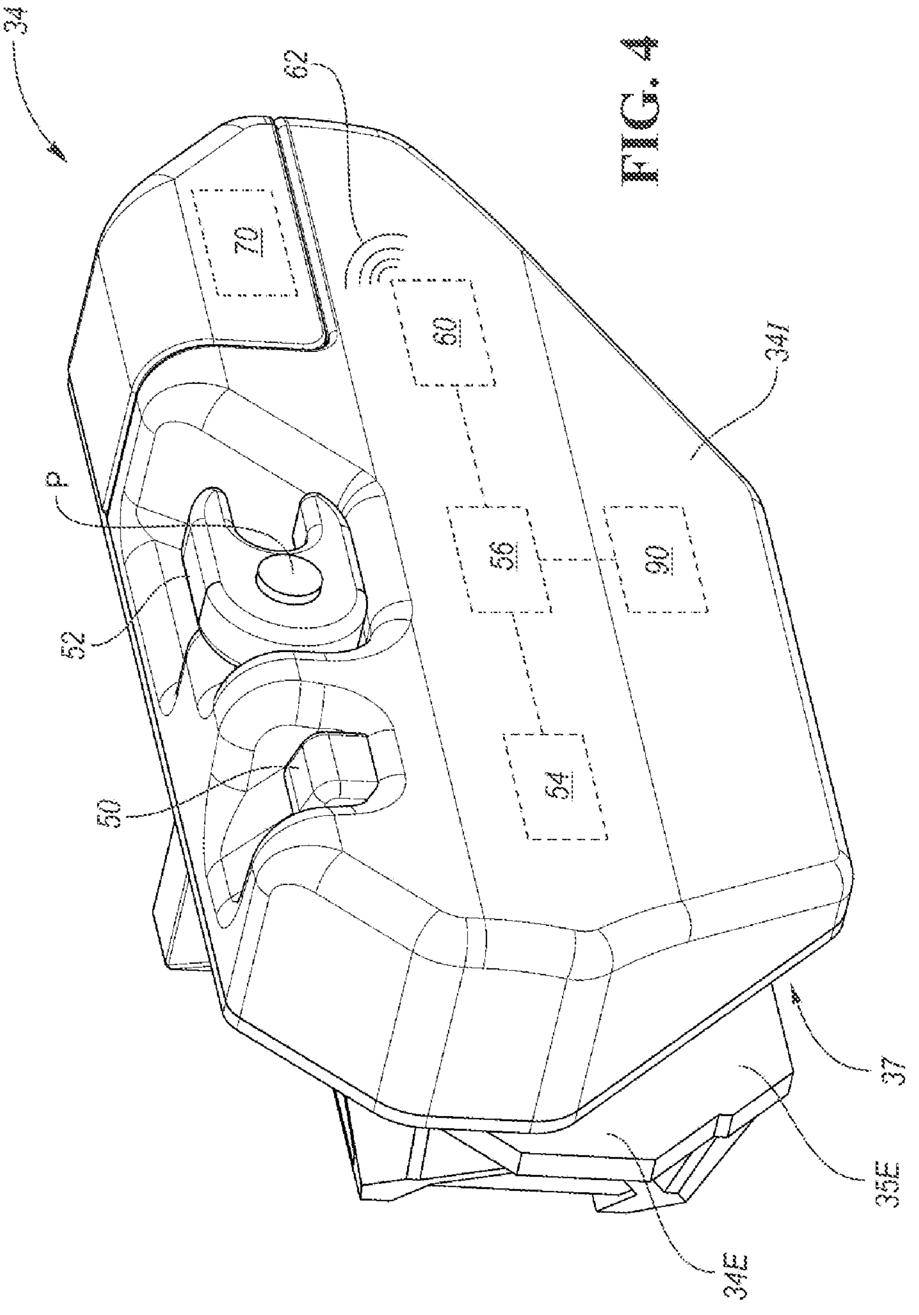
FIG. 4 is a rear perspective view of the lock portion of FIG. 2.
Figure 5:
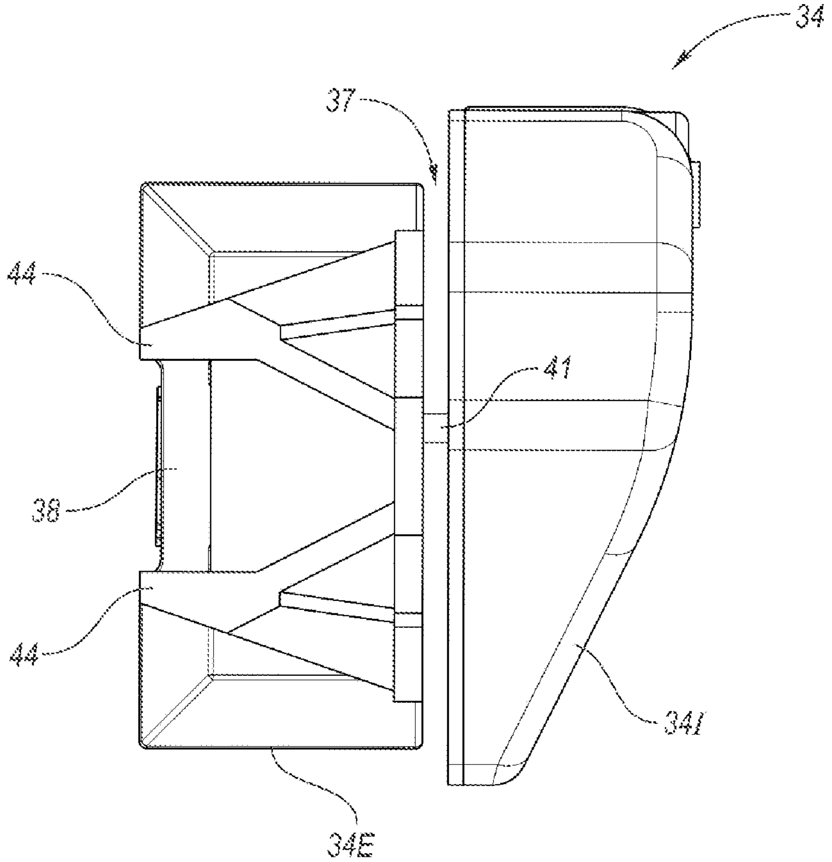
FIG. 5 is a side view of the lock portion of FIG. 2.
Figure 6:
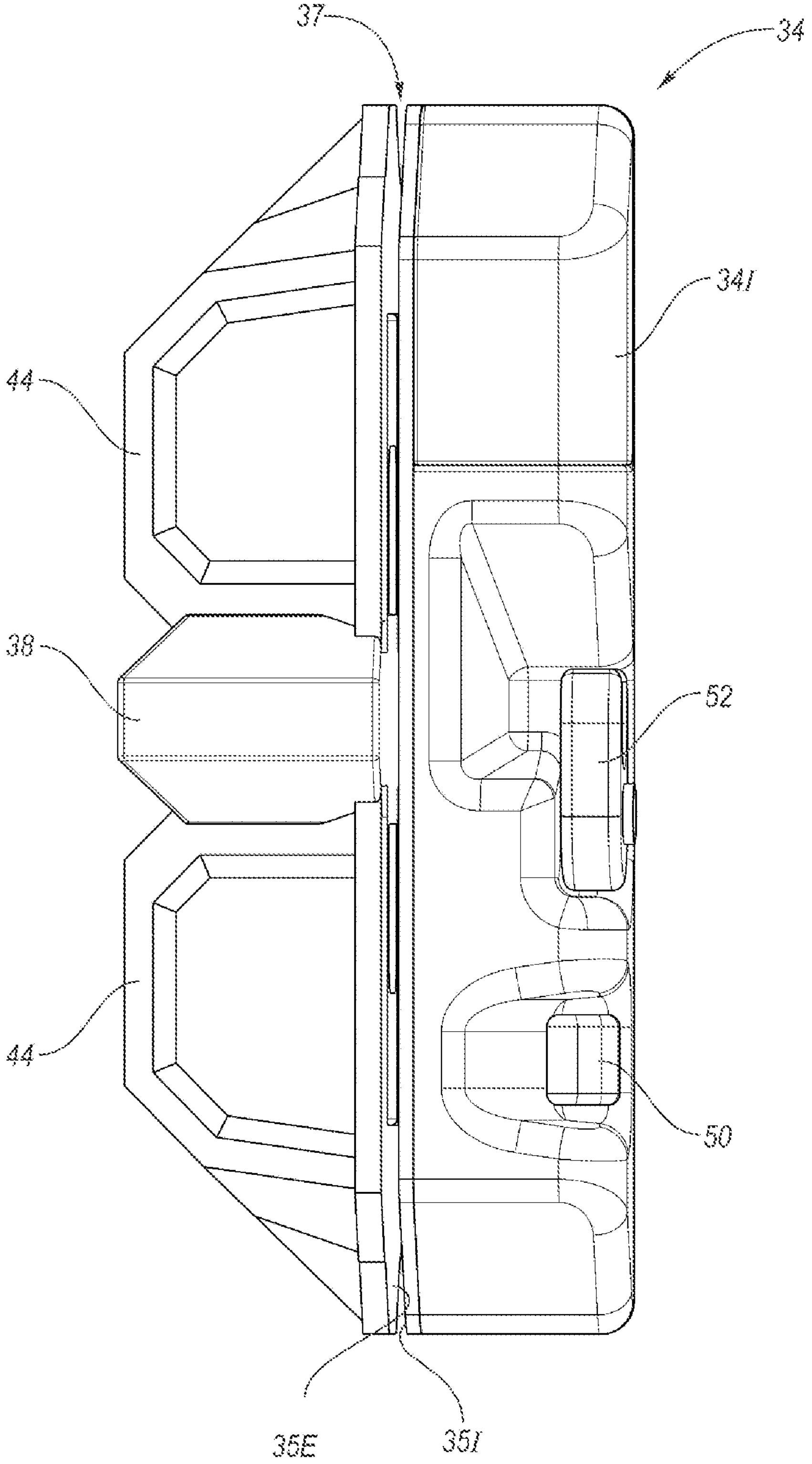
FIG. 6 is a top view of the lock portion of FIG. 2.

As shown in FIG. 4, the interior lock portion 341 includes a catch 52 that mechanically locks the hasp 32. The catch 52 can release the hasp 32 by depressing the buttons 36 as described above or the button 50. Alternatively, the catch 52 can release the hasp 32 with an actuator 54 in the interior lock portion 341 that releases a mechanical stop holding the catch 52 in place and preventing it from pivoting about a pivot axis P. The buttons 36 can be in direct mechanical contact with the actuator 54, such as an elector-mechanical actuator, to release the catch 52 or the buttons 36 can release the catch 52 mechanically without the use of the actuator 54.

Figure 9:
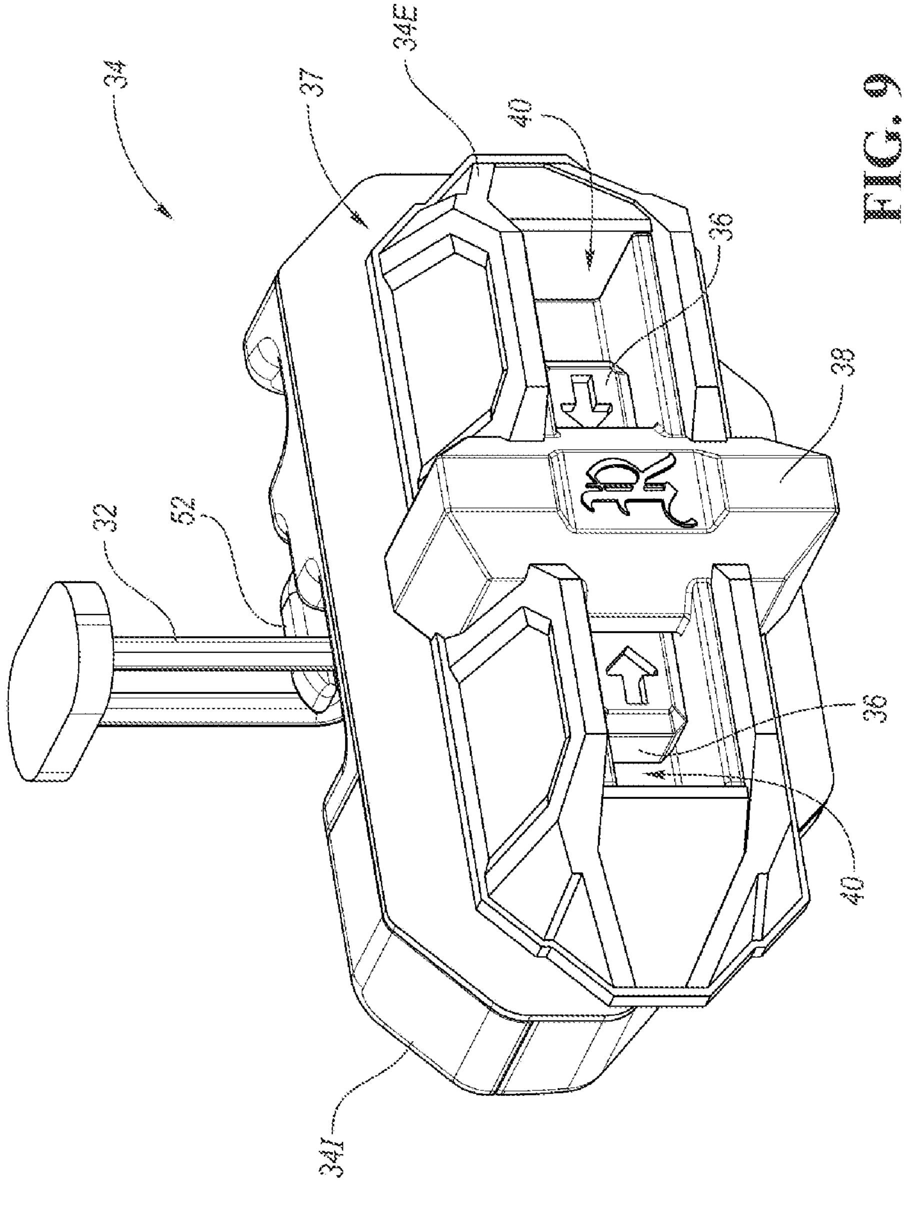
FIG. 9 is a front perspective view of the lock portion of FIG. 2 engaging a hasp.
Figure 10:
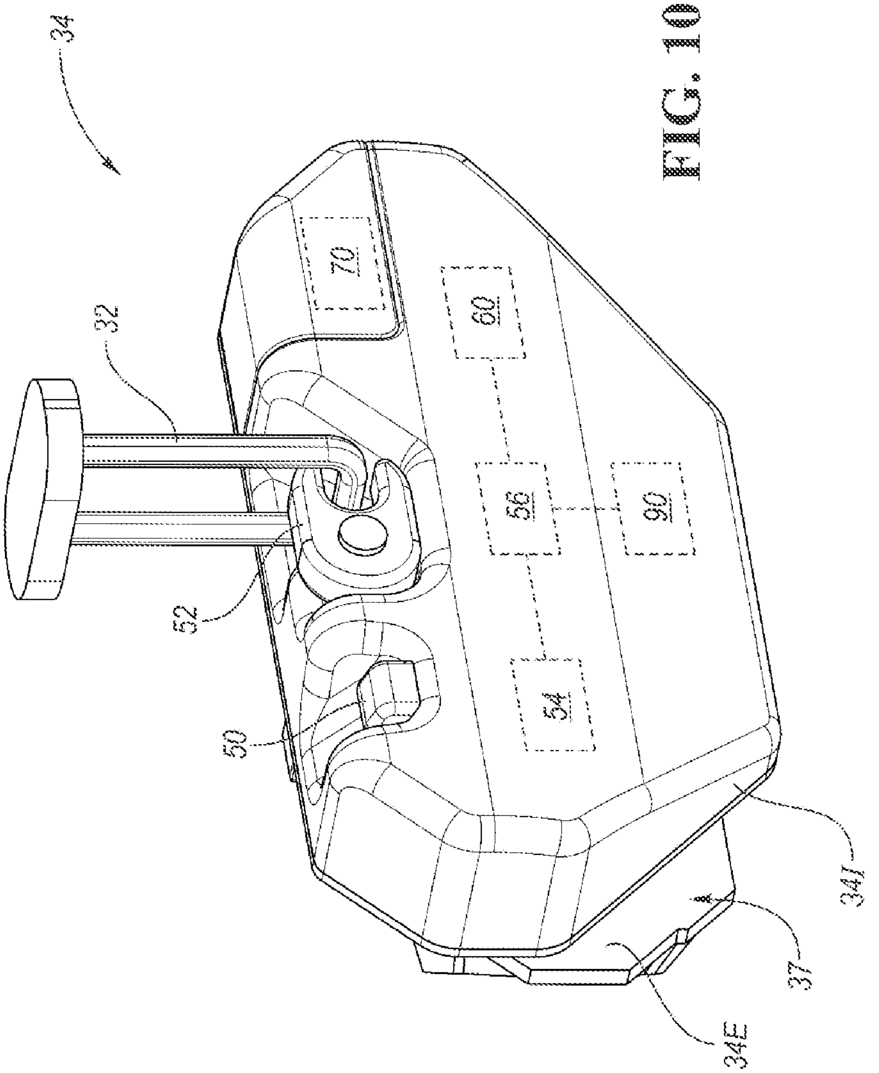
FIG. 10 is a rear perspective view of the lock portion of FIG. 2 engaging the hasp.
Figure 11:
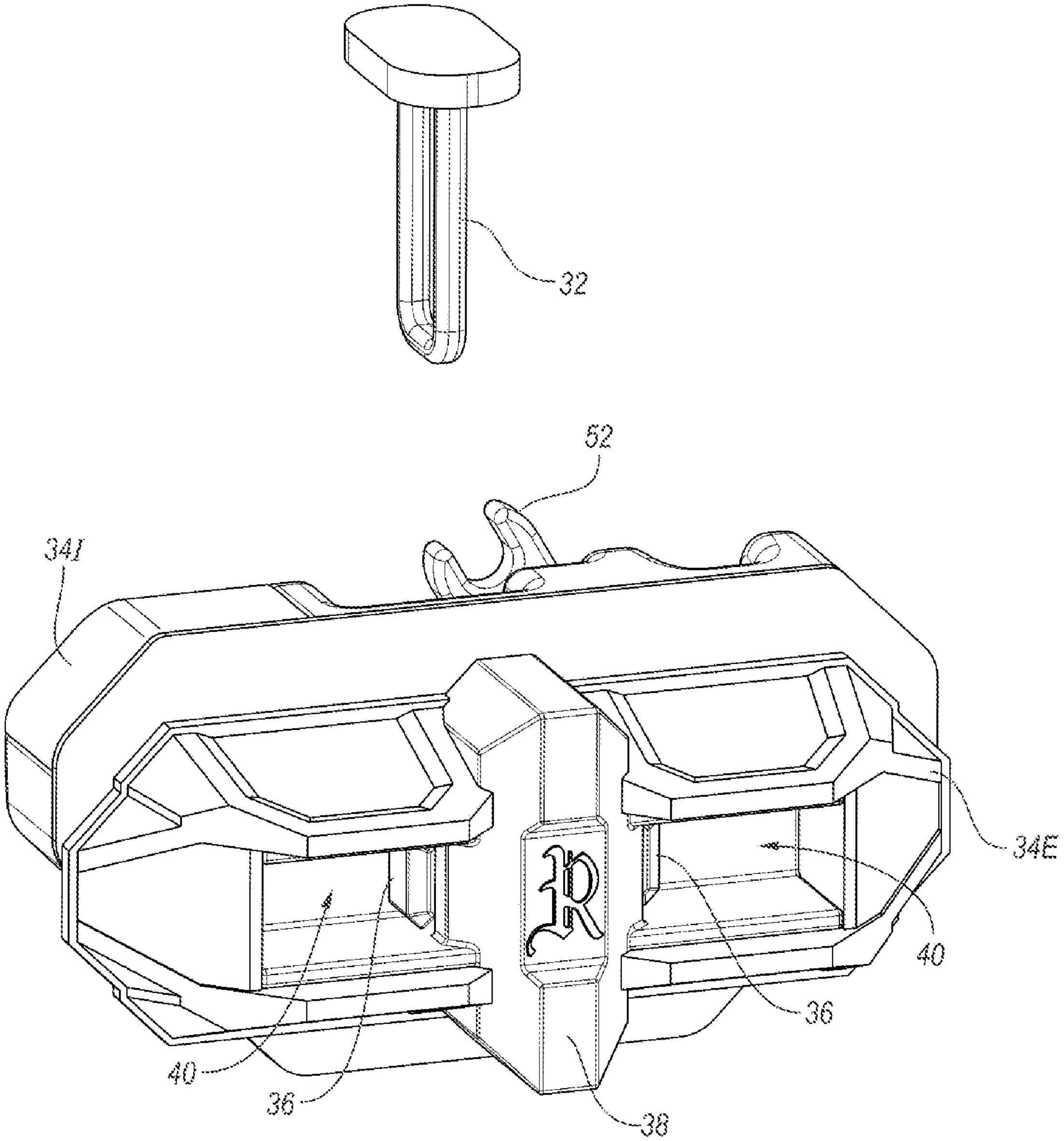
FIG. 11 is a front perspective view of the lock portion of FIG. 2 releasing the hasp.
Figure 12:
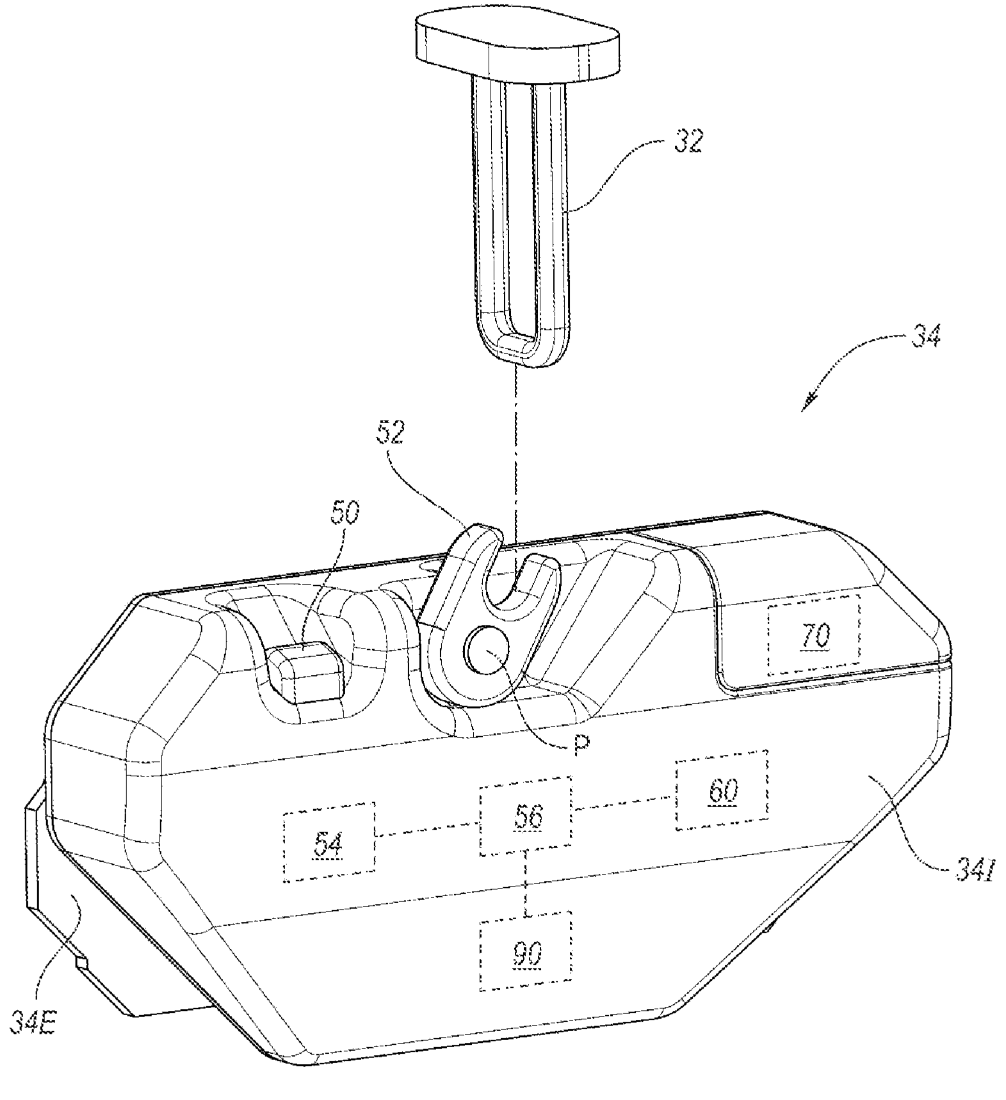
FIG. 12 is a rear perspective view of the lock portion of FIG. 2 releasing the hasp.

As shown in FIGS. 9 and 10, the hasp 32 is fixed by the catch 52 relative to the lock 34. The catch 52 can secure the hasp 32 to the lock 34 through a mechanical lock automatically without additional actuation taken by the user or the actuator 54. As shown in FIGS. 11 and 12, the hasp 32 is released from the catch 52 by depressing the buttons 36 (FIG. 11) as described above to allow the catch 52 to rotate about the pivot P into an unlocked position. When the catch 52 is in the unlocked position, the hasp 32 is allowed to move relative to the lock 34 such that the lid 24 on the cart 20 can be opened. Conversely, when the lid 24 is being closed, the weight of the lid 24 is sufficient to cause the catch 52 to pivot from a position accepting the hasp 32 to a position where the catch 52 is locked from rotation and the hasp 32 is fixed to the lock 34. Also, the catch 52 can be biased towards a fully released position as shown in FIGS. 11 and 12 to ensure that the catch 52 does close without the closing force of the lid 24. This can prevent the catch 52 from inadvertently becoming locked by an object other than the hasp 32 on the lid 24.

In the illustrated example, the actuator 54 is in electrical communication with a controller 56 located in the interior lock portion 341 or the exterior lock portion 34E. The controller 56 includes a processor and memory for performing the operations described herein. Additionally, the controller 56 is in electrical communication with a receiver/transmitter 60 for receiving and/or transmitting radio frequency ("RF") signals 62. However, the receiver/transmitter 60 may only be able to receive radio frequency signals. A reception of radio frequency ("RF") signals of sufficient magnitude within a predetermined frequency range by the receiver/transmitter 60 can cause the actuator 54 to release the catch 52 holding the hasp 32 to allow the lid 24 to pivot about the hinge 26 for emptying the cart 20. The RF signals do not need to include any information or encoding but can be any sufficiently-large RF signals within a predetermined band of RF signals to release the hasp 32 from the lock 34. Alternatively, an electronic code or information is required to be received by the receiver/transmitter 60 for the actuator 54 to allow the catch 52 to pivot and release the hasp 32.

Figure 14:
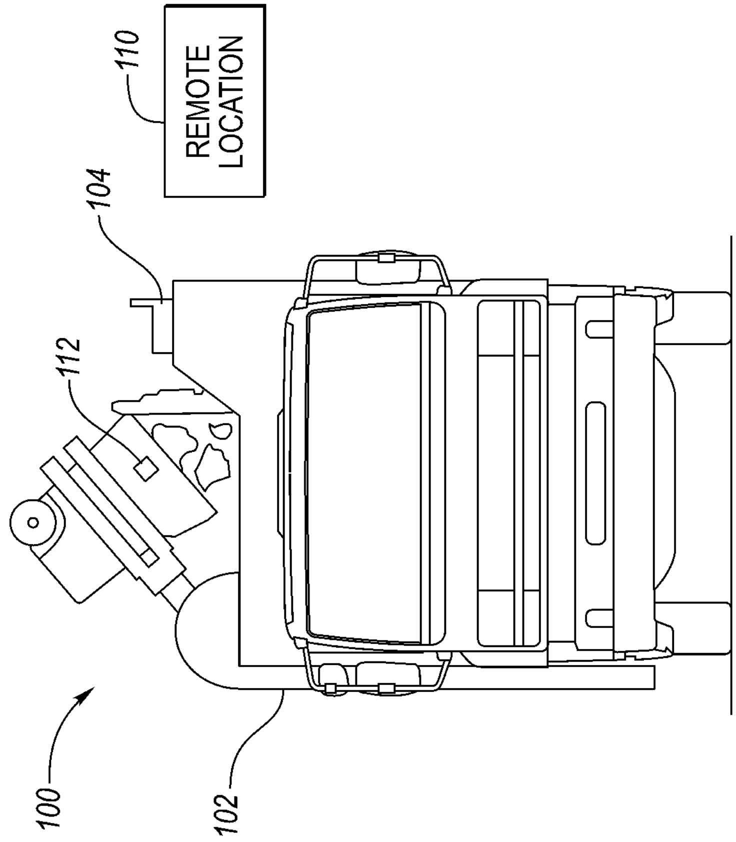
FIG. 14 illustrates the trash collecting vehicle dumping the roll-out cart of FIG. 1.
Figure 13:
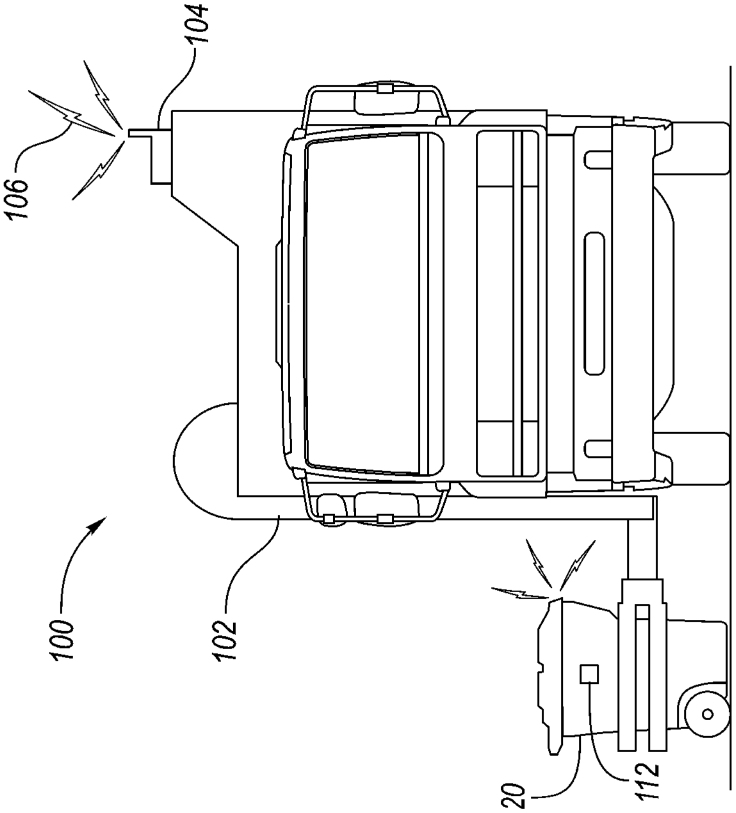
FIG. 13 illustrates a trash collecting vehicle engaging the roll-out cart of FIG. 1.

In an example method of operating the lock 34, when a trash collecting vehicle 100 is engaging the cart 20 (FIG. 13) with a lift 102 to raise the cart 20 and dump the contents into the vehicle 100 (FIG. 14), the vehicle 100 may include a RF transmitter/receiver 104. The RF transmitter/receiver 104 transmits a RF signal 106 within the predetermined range to activate the actuator 54 to release the hasp 32 and pivot the lid 24 to allow the contents of the cart 20 to be dumped into the vehicle 100. When the cart 20 is placed by the side of vehicle 100 after dumping, the RF signal 106 from the vehicle 100 will no longer be received by the receiver/transmitter 60 on the cart 20 as the vehicle 100 drives away. The controller 56 is in electrical communication with the actuator 54 and can then direct the actuator 54 to lock the catch 52 and secure the hasp 32. The RF transmitter/receiver 104 can also be used to read an RFID tag 112 on the cart 20 at the same time that the RF signal from the RF transmitter/receiver 104 is causing the actuator 54 to release the hasp 32. The RFID tag 112 can provide information about the cart 20 for billing or tracking purposes.

In addition to receiving the RF signal 106 from the vehicle 100, the lock 34 can transmit information regarding the cart 20 through RF signals 62 (FIG. 4) that are received by the RF transmitter/receiver 104. For example, the lock 34 can send information regarding a power level of a battery 70 in the lock 34 that is received by the RF transmitter/receiver 104 on the vehicle 100 to notify the operator of the vehicle 100 that the battery 70 in the cart 20 needs to be replaced. Alternatively, the battery status received by the transmitter/receiver 104 is stored on the vehicle 100 and transmitted to a remote location 110 that can send the registered user of the cart 20 through an electronic message, such as an email or text message, that the battery 70 in the cart 20 needs replacement within a predetermined length of time in order to function properly. Additionally, information regarding how frequently the cart 20 is emptied or if the cart 20 tipped over from information collected by an accelerometer 90 (FIG. 4) can be gathered to be transmitted or stored in the memory of the controller 56.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A cart comprising:

a body portion forming a receptacle;

a lid pivotable relative to the body portion; and a lock assembly including:

a hasp fixed relative to one of the lid or the body portion; and a lock fixed relative to the other of the lid or the body portion and including a catch for engaging the hasp and an actuator in electrical communication with a controller with the actuator configured to actuate the catch to selectively secure the hasp relative to the lock, and wherein the lock includes an exterior portion located on an outer side of the body portion and an interior portion located on an inner side of the body portion, the exterior portion includes at least one release button configured to selectively secure the hasp relative to the lock, the at least one release button includes a first release button located in a first recess and a second release button located in a second recess, and the first and second release buttons are movable between a first position located in a respective one of the first and second recesses and a second position at least partially recessed into a central wall dividing the first recess from the second recess and extending perpendicular to a direction of motion of the first and second release buttons; and a radio frequency receiver in electrical communication with the controller, wherein the catch releases the hasp in response to a presence of a radio frequency signal received by the radio frequency receiver without requiring a radio frequency code.

2. The cart of claim 1, wherein the catch is attached to the interior portion.

3. The cart of claim 2, wherein the catch is pivotably about a pivot axis.

4. The cart of claim 1, wherein the catch releases the hasp when the radio frequency signal received by the radio frequency receiver comprises a predetermined magnitude within a predetermined frequency range.

5. The cart of claim 1, wherein the cart includes a RFID tag, and wherein the RFID tag is read at the same time that the radio frequency signal causes the catch to be released.

6. The cart of claim 1, including an accelerometer mounted to the cart, and wherein information is collected regarding how frequently the cart is emptied or if the cart is tipped based on data collected by the accelerometer.

7. The cart of claim 1, wherein the lock assembly includes a battery, and wherein battery power level information is transmitted to a remote location.

8. A cart comprising:

a body portion forming a receptacle;

a lid pivotable relative to the body portion; and a lock assembly attached to the cart and including:

a hasp attached to the lid; and a lock fixed relative to the body portion including a catch for engaging the hasp with a first release button located in a first recess and a second release button located in a second recess, and wherein the first and second recesses are located in an exterior portion of the lock located on an outer side of the body portion, and wherein the first and second release buttons are movable between a first position located in a respective one of the first and second recesses and a second position at least partially recessed into a central wall dividing the first recess from the second recess and extending perpendicular to a direction of motion of the first and second release buttons; and a radio frequency receiver in electrical communication with a controller that actuates the catch to release the hasp in response to a radio frequency signal received by the radio frequency receiver, and wherein a RFID tag associated with the cart is read at the same time that the radio frequency signal causes the catch to be released.

9. The cart of claim 8, wherein the first release button and the second release button are separated by a central wall and are depressible in a direction of the central wall.

10. The cart of claim 8, wherein the lock includes an exterior portion located on an outer side of the body portion and an interior portion located on an inner side of the body portion.

11. The cart of claim 10, wherein the first release button and the second release button are located on the exterior portion.

12. The cart of claim 11, wherein the catch is attached to the interior portion.

13. The cart of claim 8, wherein the lock includes an actuator configured to selectively actuate a catch to secure the hasp relative to the lock.

14. The cart of claim 13, including an RF transmitter in electrical communication with the controller configured to actuate the catch.

15. The cart of claim 8, wherein the controller actuates the catch to release the hasp in response to a presence of the radio frequency signal received by the radio frequency receiver without requiring a radio frequency code, the radio frequency signal being the same radio frequency signal that reads the RFID tag.

16. The cart of claim 15, wherein the catch releases the hasp when the radio frequency signal received by the radio frequency receiver comprises a predetermined magnitude within a predetermined frequency range.

17. The cart of claim 8, including an accelerometer mounted to the cart, and wherein information is collected regarding how frequently the cart is emptied or if the cart is tipped based on data collected by the accelerometer.

18. The cart of claim 8, wherein the lock assembly includes a battery, and wherein battery power level information is transmitted to a remote location.

19. A method of operating a lock assembly, the method comprising:

engaging one of a hasp or a catch attached to a lid of a cart with the other of the hasp or the catch attached to a body portion of the cart to fix the lid relative to the body portion;

releasing the catch relative to the hasp in response to the lock assembly receiving a signal from a remote location, the signal comprising a radio frequency signal received by a radio frequency receiver associated with the cart without requiring a radio frequency code; and wherein the cart includes a RFID tag, and including reading the RFID tag at the same time that the radio frequency signal causes the catch to be released.

20. The method of claim 19, wherein the remote location includes a trash collecting vehicle, and the lock assembly includes the radio frequency receiver which is in communication with a controller for directing an actuator to release the catch relative to the hasp.

21. The method of claim 19, wherein the lock assembly includes an exterior portion located on an outer side of the body portion and an interior portion located on an inner side of the body portion with a first release button located in a first recess in the exterior portion and a second release button located in a second recess in the exterior portion and depressing at least one of the first or second release buttons releases the catch relative to the hasp.

22. The method of claim 19, wherein the lock assembly includes an exterior portion located on an outer side of the body portion and an interior portion located on an interior of the body portion and the catch is located on the interior portion.

23. The method of claim 19, wherein the catch releases the hasp when the radio frequency signal received by the radio frequency receiver comprises a predetermined magnitude within a predetermined frequency range.

24. The method of claim 19, including mounting an accelerometer to the cart and collecting information regarding how frequently the cart is emptied or if the cart is tipped based on data collected by the accelerometer.

25. The method of claim 19, wherein the lock assembly includes a battery, and including transmitting battery power level information to a remote location.

* * * * *